United States Patent [19]

Stahnke

[11] Patent Number: 5,050,116

[45] Date of Patent: Sep. 17, 1991

[54] KEYBOARD FOR DATA PROCESSING EQUIPMENT

[76] Inventor: Willi Stahnke, Gomaringer Strasse 9, 7000 Stuttgart 70, Fed. Rep. of Germany

[21] Appl. No.: 92,667

[22] Filed: Sep. 3, 1987

[30] Foreign Application Priority Data

Sep. 3, 1986 [DE] Fed. Rep. of Germany ....... 3630034
May 2, 1987 [DE] Fed. Rep. of Germany ....... 3714707

[51] Int. Cl.⁵ .............................................. G06F 3/023
[52] U.S. Cl. ................................................. 364/709.15
[58] Field of Search ............................... 364/708-710, 364/710.05; 340/365 R, 365 VL, 720

[56] References Cited

U.S. PATENT DOCUMENTS

| | | | |
|---|---|---|---|
| 4,481,598 | 11/1984 | Ishiwata | 364/710 |
| 4,547,860 | 10/1985 | Lapeyre | 364/709.15 X |
| 4,633,227 | 12/1986 | Menn | 340/365 VL |
| 4,634,970 | 1/1987 | Payne et al. | 340/720 X |

*Primary Examiner*—David L. Clark
*Assistant Examiner*—Tan V. Mai
*Attorney, Agent, or Firm*—Evenson, Wands, Edwards, Lenahan & McKeown

[57] ABSTRACT

A keyboard for data processing equipment, the keyboard having a display screen and at least one key group switchable between different sets of functions. At least one image of the key group as well as function and meanings assigned to the keys of the key group appear on the display screen.

14 Claims, 4 Drawing Sheets

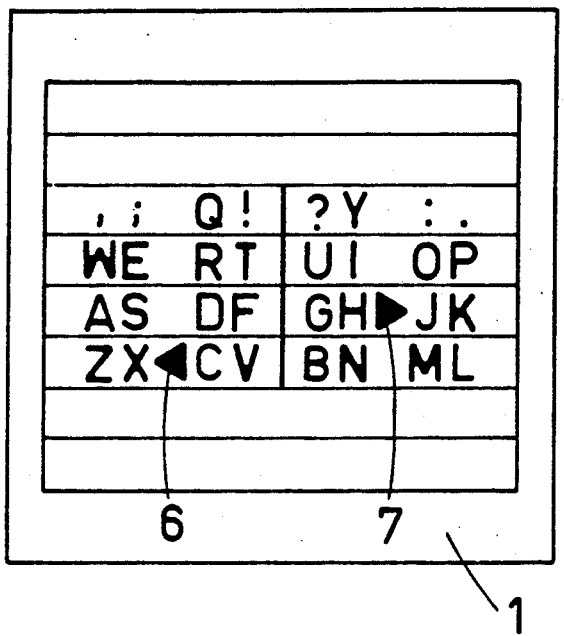
FIG. 2
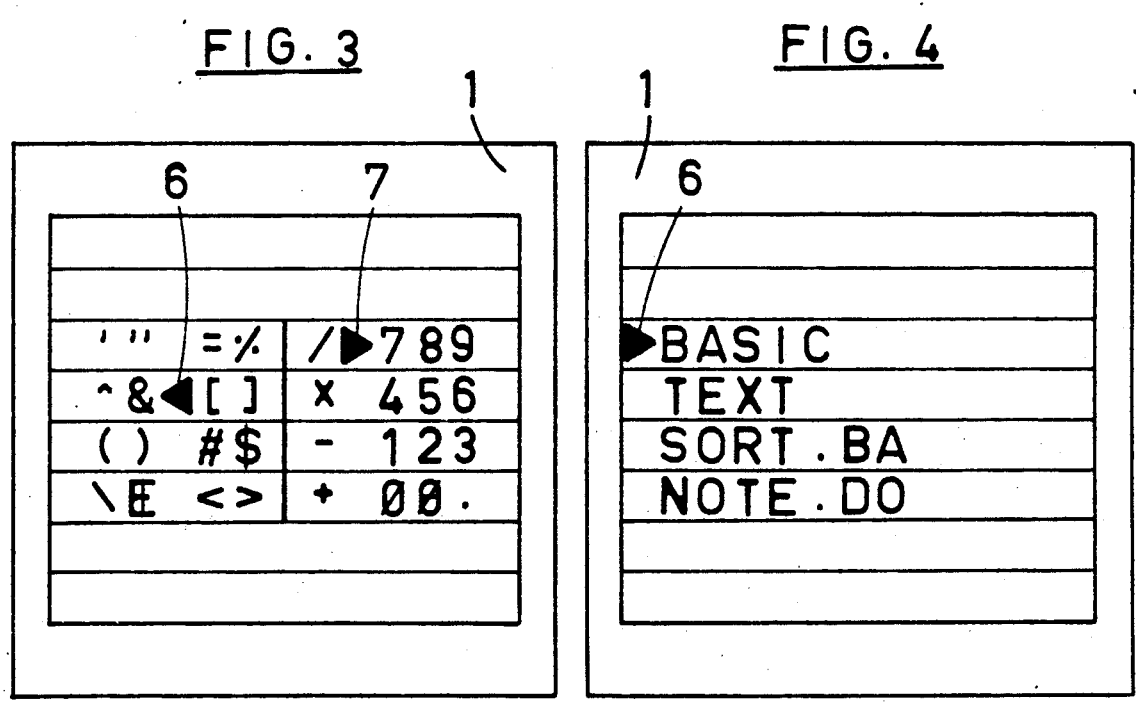
FIG. 3
FIG. 4

KEYBOARD FOR DATA PROCESSING EQUIPMENT

BACKGROUND AND SUMMARY OF THE INVENTION

The present invention relates to a keyboard for data processing equipment, particularly for word processing equipment.

Keyboards of conventional data processing equipment are usually very extensive and correspondingly complex in view of the large number of functions that can be carried out by the data processing unit. Although it is basically possible to arrange changeable key groups, so that a key triggers different functions or produces different types of information according to the change-over that took place, this type of change-over corresponds basically to the switching of a typewriter from small-letter to capital-letter typing.

When a large number of change-over possibilities exists, however, it is difficult for the user of the keyboard to maintain a perspective.

It is therefore an objective of the present invention to provide a keyboard that, despite a small number of keys, makes it possible to carry out an extremely large variety range of functions in a clear manner.

This and other objectives are achieved in the present invention by providing a keyboard with a display screen, and at least one group of keys switchable between different sets of functions. At least one image of this group of keys and the functions and meaning that are assigned to the pertaining keys of the key group appear on the display screen.

Therefore, according to the present invention, the respective meaning or function of each key of a switchable group of keys is pictured. If, for example, a group of keys is provided for the processing of different alphanumerical symbols (letters of different alphabets, numbers in different representations), after each switch-over, those symbols appear in the display that, as a result of the respective switch-over, were assigned to the keys, for example, letters of the Latin or of the Greek alphabet, or special characters or the like.

If the keys of a switchable group, after the switch-over, are to be used for initiating program parts of a data processing program or particularly of a word processing program, the corresponding information will appear on the picture display screen.

Basically, however, the displaying of keys as well as of the assigned functions or meanings on a display screen is advantageous also if the keys are not part of a switchable group of keys. This is because, by means of the invention, when operating the keyboard, the function and the meaning of the keys is within view when the keys themselves are covered by the hands.

A particularly advantageous embodiment is provided in which two groups of keys that are pictured in the display are arranged on both sides of the picture display. In this embodiment, the images appearing on the picture display screen that reflect the functions and the meanings of the keys are each assigned to the pertaining keys in the same line. The finding of a desired key is therefore facilitated by the fact that this key and the image that is assigned to it are arranged in the same line or at the same level.

A particularly clear arrangement is provided when the groups of keys that are shown by images on the picture display screen have keys that are arranged in four or five lines as well as four or five columns.

The guiding of the hands on the keyboards as well as the operating of the keys are facilitated in certain preferred embodiments by a ledge-type enlargement between the keyboards and the picture display. This enlargement provides to the hands operating the groups of keys an orientation above the keys with respect to the correct position of the hands.

In addition, in an advantageous embodiment of the invention, in each line of the key groups that are displayed by images on the picture display screen, at least one key is equipped with a touch sensor and that on the picture display screen or at or in the image of this key group, the respective touched line can be indicated. In this way, the operator of the keyboard can at any time see the position of the hand or hands on the switchable key groups on the picture display screen. As a result, the operation of the keyboard can be considerably facilitated.

In addition, in certain embodiments the picture display also has a separate area or part for the display of the respective data that was fed in last. Therefore if, for example, a text is put in, the respective last words, lines or the like will appear in this area or part of the picture display.

In an advantageous feature of the preferred embodiment, within the reach of the thumbs of the hands that operate the key groups that are displayed by the images on the picture display screen, special keys are arranged. Of these special keys, a shift key causes the shifting of the typing of letters from small to capital letters, and an adjacent space key causes the insertion of a space behind the last fed-in symbol or letter. In this embodiment, the keys are preferably arranged next to one another in such a way that a simultaneous operation by one thumb is possible. Thus, the fact is taken into account that capital letters, in the conventional writing of words, as a rule, denote the beginning of a word, and a space should be inserted in front of the capital letters and thus after the last fed-in symbol.

It is particularly advantageous for the special keys to be arranged symmetrically on the keyboard, for example, with a large ledge-type space key under the picture display, and on both sides of this space key, symmetrical capital-small letter shift keys, and behind those keys, space keys arranged successively in one line. It is contemplated to provide that the respective last space keys be followed by switch-over keys which are used for the switching-over of the switchable key groups to special symbols. In such a contemplated embodiment, a joint operating of a space key with a switch-over key for special symbols with one thumb is also possible.

In particular, the ledge-type space key is operable such that, during an extended operating of this key, several blank spaces behind one another or one blank line can be produced.

In order to be able to utilize the storage capacity of the data processing unit for an amount of information that is as large as possible, it is provided according to a particularly preferred embodiment of the invention that to each key of the switchable group of keys, a multi-bit (for example, six-bit) binary digit sequence is firmly assigned that, when the key is operated, is produced as a correspondingly coded signal. This binary digit sequence, at an indicated bit position (for example, at the first bit position) always has the same binary digit (such as 0). When the key group is switched over, a coded signal corresponding to another, second binary digit sequence is produced that has the same number of positions as the above-mentioned digit sequence, but at the same indicated (for example, first) bit position, always has the other binary digit (for example, 1). In this case the signal that corresponds to the second binary digit sequence indicates to which group of functions or meanings the signals belong that are then produced by the operation of the keys.

Since the switch-overs of the key groups are necessary comparatively infrequently, large amounts of symbols are storable in the memory with an extremely low space requirement.

Other objects, advantages and novel features of the present invention will become apparent from the following detailed description of the invention when considered in conjunction with the accompanying drawings.

BRIEF DESCRIPTION OF THE DRAWINGS

FIG. 2 is a first image of switchable keys on the picture display screen showing the keyboard.

FIG. 3 is an example of another corresponding image that appears after a switch-over of the keyboard.

FIG. 4 is an example of another image that appears after another switch-over.

DETAILED DESCRIPTION OF THE DRAWINGS

Figure 1:
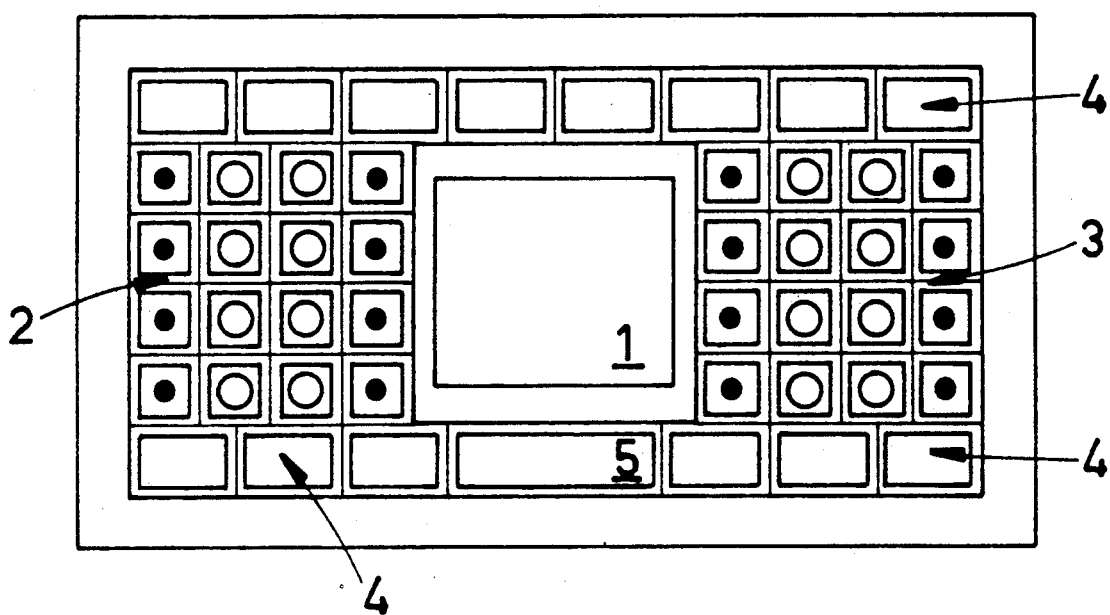
FIG. 1 is a top view of a preferred embodiment of the keyboard according to the present invention.

According to FIG. 1, a preferred embodiment of a keyboard according to the present invention has a picture display screen 1 that operates, for example, with liquid crystal elements, and has key groups 2 and 3 that are arranged on the side of the display screen 1. These key groups 2 and 3 each comprise 16 keys that are arranged in four lines and four columns.

Above and below the picture display screen 1 and key groups 2 and 3, special keys 4 and 5 are arranged, with key 5 being a space key in the illustrated embodiment.

The function of the keys of the key groups 2 and 3 may be switched over by operating one of the special keys 4, for example. By means of these special keys 4, in one case, essentially letters, perhaps corresponding to FIG. 2, and in another case, essentially special characters and numbers, perhaps corresponding to FIG. 3, may be written or fed in.

A feature of the present invention is the automatic display of the respective meaning or function of the keys of the key groups 2 and 3 on the display screen 1 after each switch-over. This display is, for example, an image corresponding to FIG. 2 or FIG. 3 on the display screen 1. Thus, when the key groups 2 and 3 are switched over to the symbols corresponding to FIG. 2, the letters Z, X, C and V may, for example, be written with the four keys of the bottom line of key group 2, etc.

In this embodiment, the images on the display screen and the pertaining keys of key groups 2 and 3 are advantageously arranged in one line. In other words, a key that writes the letter Z, for example, is located in the same line or at the same level as the assigned image on the display screen 1.

In preferred embodiments, touch sensors are arranged on the keys of both center columns of each key group 2 and 3 which control display markers 6 and 7 on the display screen 1. When, for example, one of the keys with a touch sensor in the bottom line of key group 2 is touched, the display marker 6 appears corresponding to FIG. 2 in the bottom line of the image that is assigned to key group 2. When a key with a touch sensor in the third line (from the top) of key group 3 is touched, the display marker 7 appears in the third line of the corresponding image, as also shown in FIG. 2. The same is true when keys with a touch sensor are touched in another line.

In certain preferred embodiments, the keys of key groups 2 and 3 are also used for triggering programming commands or for program selection or word processing. When key groups 2 and 3 are switched over for this type of a purpose, according to FIG. 4, corresponding information will appear on the display screen 1, in which the programs or commands or the like shown in each line of the display screen 1, if necessary, may be selected or triggered by operating any arbitrary key of the key group 2 or 3 in the corresponding line of these key groups 2 or 3.

In order to be able to represent the symbols, commands and the like that were written with the keys of keyboards 2 and 3 with as little space requirement as possible, each of the 32 keys of key groups 2 and 3 are assigned a six-position binary digit sequence, such as 000000, 000001, . . . , 011110 and 011111

All these digit sequences have in common that a binary 0 is in the first position.

As soon as one of the keys of key groups 2 and 3 is operated, a signal is generated and stored corresponding to one of the indicated binary digit sequences.

In order to determine whether the signal that is triggered by a key of key groups 2 and 3 has the meaning of one of the symbols of FIG. 2 or of FIG. 3 or the like, signals are generated during the switching-over of the key groups 2 and 3 that differ according to the type of switch-over. These signals represent a six-position binary digit sequence that in the first position starts with a binary 1, such as 100000, 100001, . . . , 111110 and 111111.

These signals are also stored. During the read-out of the memory, the last-indicated signals therefore show to which group of symbols or commands the later stored signals must be assigned. These signals are each represented by six-position binary digit sequences with a binary 0 in the first position.

Figure 5:
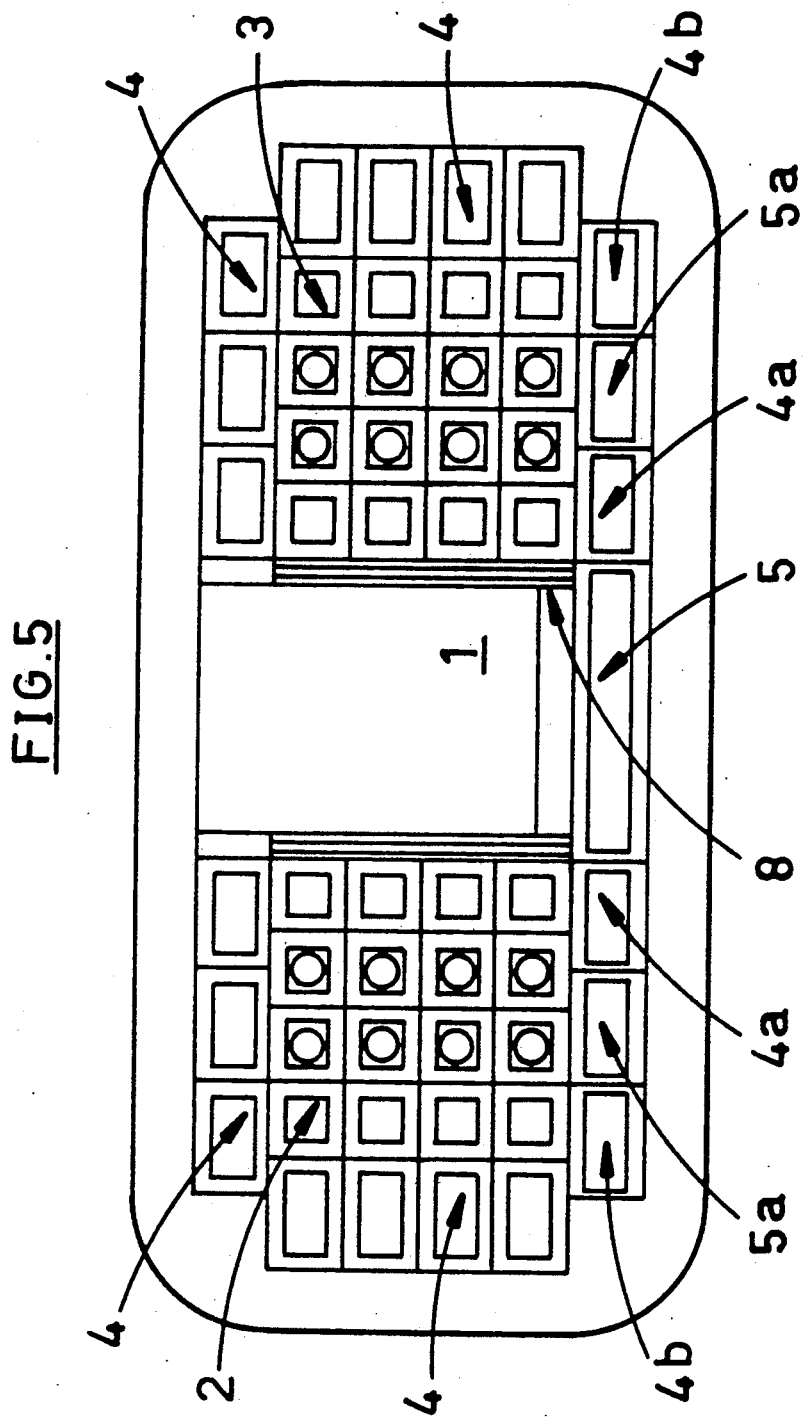
FIG. 5 is a top view of a second preferred embodiment of the keyboard according to the invention.

The preferred embodiment of the keyboard shown in FIG. 5 differs from the embodiment of FIG. 1 mainly because of the fact that the display screen 1 is sufficiently large in order to be able to display, in addition to the functions and meanings of the keys of keyboards 2 and 3, also the respective last fed-in letters, words, commands, etc. This can be seen in the example of FIG. 6 by showing there above the images reflecting the meaning of the keys, a text that was, for example, fed in last ("alles im Blickfeld").

Figure 7:
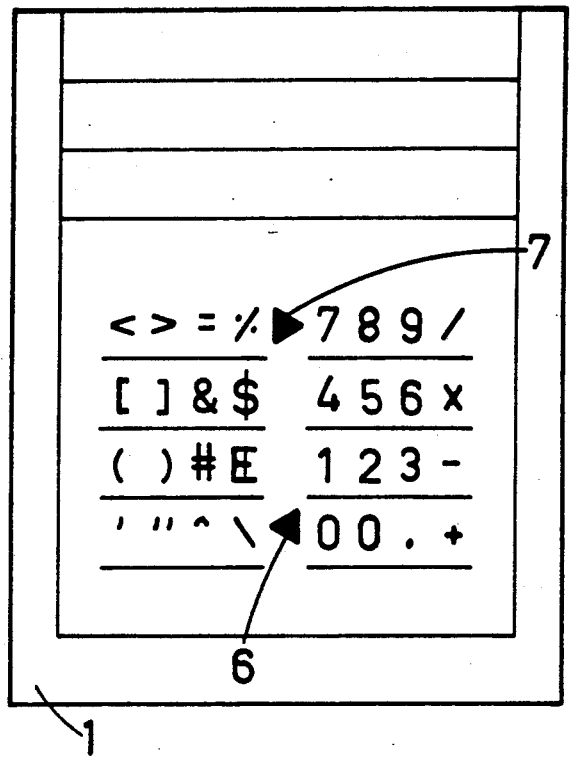
FIG. 7 is an example of another image of switchable keys after a switch-over of the keyboard.
Figure 8:
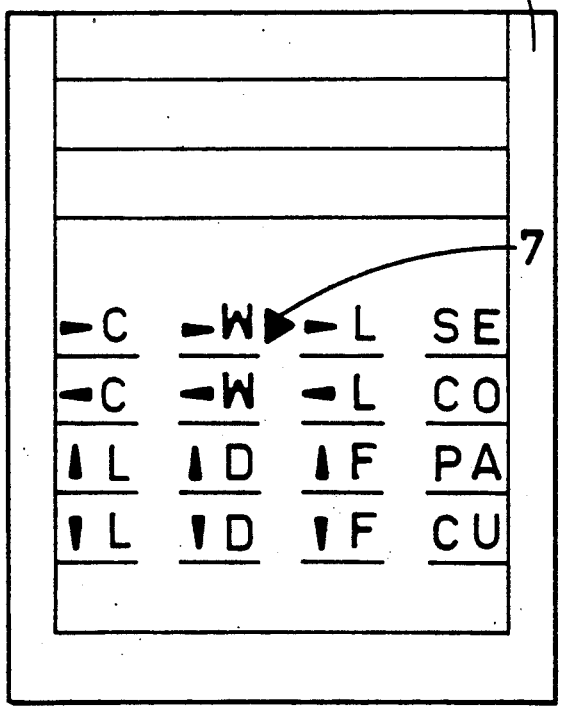
FIG. 8 is an example of another image after a switch-over to word processing functions.

In addition, the keyboards 2 and 3, by operating switch-over keys 4, which in the example of FIG. 5, are also arranged on the right and left on the outside next to key groups 2 and 3, may in turn be switched over to different functions and meanings that are shown as examples in FIGS. 7 and 8. In this case, FIG. 7 shows a switch-over to numbers and special symbols, while FIG. 8 shows a switching-over to programming commands or word processing functions. In FIG. 8, the commands are in each case triggered by the operation of one or two adjacent keys.

Between the display screen 1 and each of the key groups 2 and 3, in the embodiment shown in FIG. 5, enlargement-type ledges 8 are in each case firmly arranged that have the purpose of guiding the hand or fingers operating key groups 2 and 3. The thumb may rest on a ledge 8, while the four fingers of the hand operate the keys of key groups 2 or 3 that are both arranged in four columns.

Under the display screen 1, a ledge-type key 5 is arranged which is within reach of the thumbs of both hands. This key 5 may have the function of a space key, which advantageously is constructed so that a short operation of the key produces only one space position behind the last fed-in symbol or letter, while a longer pressing can produce several space positions or one blank line.

The switch-over keys 4 and 4a on the left and right sides of the keyboard may have slightly different functions:

By operating a key 4 on the left side the function of the key groups 2 and 3 are switched over to different selected functions and meanings as described above, and the respective selected functions and meanings of the key groups 2 and 3 are retained (irrespective to the multitude of keys 2 and 3 operated thereafter) until a subsequent operation of a key 4 on the left side. Thereby the operator is enabled to operate a series of keys of groups 2 and 3 with the respectively selected functions and meanings without keeping the said key 4 pushed.

By operating a key 4 on the right side the functions and meanings of the key groups 2 and 3 are similarly shifted, but the respective selected functions and meanings have to be retained by keeping the selected key 4 pushed. After releasing said key 4 the respective selected functions and meanings are only retained for a single subsequent operation of one of the keys of groups 2 and 3. After this single subsequent operation the functions and meanings of the key groups 2 and 3 are automatically switched over to "normal" functions and meanings (as shown as an example in FIG. 6) or to those functions and meanings which had been selected by operation of a key 4 on the left side before the respective key 4 on the right side was operated.

The keys 4a on the left and right side of the keyboard have similarly different functions.

If the left key 4a is shortly operated the key groups 2 and 3 are—as an example—switched over from small to capital letters or vice versa, and this shift will be retained until a subsequent operation of the left key 4a. This enables the operator to easily type or store a series of capital or small letters without keeping the said left key 4a pushed.

After operating the right key 4a the respective shift to—as an example—capital letters is only retained for a simultaneous and/or a single subsequent operation of a key of groups 2 and 3, thereafter the key groups 2 and 3 are automatically switched over to typing or storing small letters.

Keys 4a are arranged symmetrically on both sides of key 5 and in one line. These keys 4a may have the function of capital-letter/small-letter shift keys, and their operation has the result that the symbol or letter that is fed-in by the simultaneous or subsequent operation of a key of key group 2 or 3, instead of being a small letter will be produced as a capital letter. Keys 5a, which also produce spaces like key 5, are arranged directly next to keys 4a. Both key 5a and key 4a may, if necessary, be operated simultaneously with one thumb, in which case it is up to the operator to decide whether the respective left keys are operated with the thumb of the left hand, or the respective right keys are operated with the thumb of the right hand. This permits a simultaneous operation which takes into account that capital letters are as a rule found at the beginning of a word and therefore behind a blank position in a text.

Figure 6:
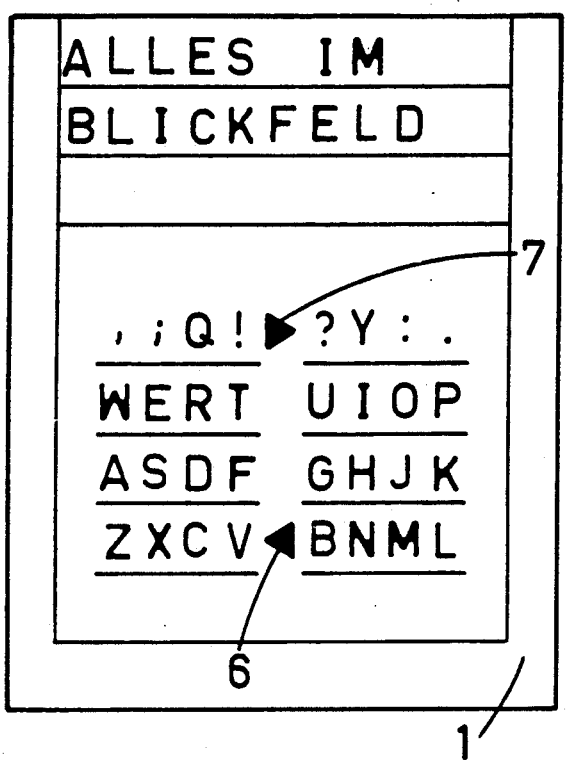
FIG. 6 is an image of switchable keys on the picture display screen of the keyboard shown in FIG. 5, in which as an example, the last fed-in words also appear on the picture display screen.

Keys 4b that follow keys 4a have the purpose of switching the keys of key groups 2 and 3 from the functions and meanings shown in FIG. 6, i.e., from standard meanings or functions, over to frequently required special meanings or functions according to FIG. 7. In this embodiment, the keys 4b are switchable in such a way that the meanings and functions shown in FIG. 7 are caused only for as long as one of the keys 4b is pressed down. When the keys 4b are released, an automatic switching takes place back to the standard meanings and functions according to FIG. 6.

The keys 4b have, as mentioned above, the purpose of switching the keys of key groups 2 and 3 from the functions and meanings shown in FIG. 6, i.e., from standard meanings or functions like letters, over to frequently required meanings and functions like figures and symbols according to FIG. 7.

The key 4b on the left side and the key 4b on the right side may have the following different functions:

If the left key 4b is shortly operated, the respective shift from the standard functions and meanings to the frequently required functions and meanings or vice versa will be retained until a subsequent operation of said key 4b (or one of keys 4).

By operating the right key 4b the functions and meanings of the key groups 2 and 3 are also switched over from the standard to the frequently required functions and meanings. But this shift is only retained for a simultaneous operation and/or a single subsequent operation of a key of key groups 2 and 3. Thereafter, the key groups 2 and 3 are automatically switched over to the standard functions and meanings, and simultaneously a space or blank position is automatically typed or stored. It is therefore taken into account that blank or space positions have to be typically put between standard symbols like letters and other symbols like numbers.

It should be noted that the operator can simultaneously operate key 4b on the right side or key 4b on the left side and the respectively adjacent key 5a with his right or left thumb. Thereby a blank or space position is typed or stored simultaneously with shifting the functions and meanings of key groups 2 and 3.

Figure 9:
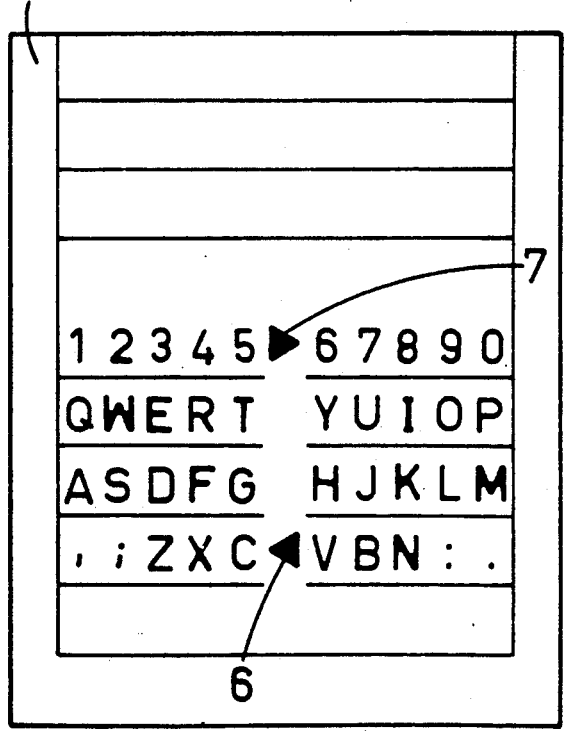
FIG. 9 is an example of an image for keyboards with keys that are arranged in four lines and five columns.

FIG. 9 shows a display screen which, as an example, shows the standard functions and meanings of key groups 2 and 3. These key groups 2 and 3 each consist of 20 keys that are arranged in four lines and five columns. As a result, in addition to all letters of the Latin alphabet, also numbers 0 to 9 as well as frequent symbols may be written without switch-over. Upon a switching-over of the key groups, many other functions or the like may then be triggered.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A keyboard for data processing equipment, comprising:
   a display screen;
   at least one key group switchable between different sets of functions, said at least one key group being arranged on one side of said display screen;
   wherein at least one image of said key group and functions assigned to keys of said key group appear on said display screen and said images representing said functions of said keys being arranged in a same line and at the same level as said assigned keys; and
   at least two key groups, arranged on respective sides of said display screen;
   wherein said display screen displays both an image of said key groups and functions assigned to said keys, and said images representing said functions of said keys being arranged in a same line as said assigned keys.

2. A keyboard according to claim 1, wherein said keys of each said key group displayed in said images on said display screen are arranged in four lines and four columns.

3. A keyboard according to claim 1, wherein said keys of each said key group displayed in said images on said display screen are arranged in four lines and five columns.

4. A keyboard according to claim 3, further comprising a ledge-type enlargement between said key groups and said display screen.

5. A keyboard according to claim 4, wherein in each line of said key groups at least one key has a touch sensor, and being indicated on said display screen at said image of said key groups.

6. A keyboard according to claim 5, further comprising light displays of different colors arranged in lines or columns at or next to said keys of said key groups.

7. A keyboard according to claim 6, wherein said display screen has a separate area for the displaying last-fed data and symbols.

8. A keyboard according to claim 7, further comprising special keys within a range of thumbs of an operator, one of said special keys actuating switching-over of the writing of letters from small to capital letters, and a key adjacent said special key causing insertion of a space behind said last fed-in symbol or letter, one said space insertion key and one said capital-small letter shift key being positioned for simultaneous operation by a single thumb of the operator.

9. A keyboard according to claim 8, further comprising said space insertion and capital-small letter shift keys arranged on right and left sides of the keyboard symmetrically to one another, for selective operation by the thumbs of both hands of said operator.

10. A keyboard according to claim 9, wherein one of said space insertion keys is arranged in a center.

11. A keyboard according to claim 10, wherein said center space insertion key produces several blank spaces or one blank line with said center space insertion key is operated for a relatively long period of time.

12. A keyboard according to claim 11, further comprising a switch-over key for switching-over said key groups to special symbols, arranged next to at least one said space insertion key such that said switch-over key is operable jointly with said adjacent space insertion key.

13. A keyboard according to claim 12, further comprising a ledge-type space insertion key under said display screen, and wherein on both sides of said space insertion key, capital-small letter shift keys, blank keys and switch-over keys are arranged symmetrically and successively in one line.

14. A keyboard according to claim 13, wherein each said key of said key groups is assigned a first multi-bit binary digit sequence that is produced as a correspondingly coded signal when said key is operated, which at an indicated bit position always having the same binary digit, and wherein after said key groups are switched over to said different set of functions, different coded signals are produced having a second binary digit sequence, having the same number of bits as said first digit sequence, but at said indicated bit position, each having the other binary digit, such that a signal which has said second binary digit sequence indicates to which group of functions said signals belong that are produced by operating said keys.

* * * * *